United States Patent … US 8,184,728 B1
Mahmoud et al. … May 22, 2012

(54) ADAPTIVE SYMBOL TRANSITION METHOD FOR OFDM-BASED COGNITIVE RADIO SYSTEMS AND METHOD OF USE

(75) Inventors: Hisham A. Mahmoud, Tampa, FL (US); Huseyin Arslan, Tampa, FL (US)

(73) Assignee: University of South Florida, Tampa, FL (US)

(*) Notice: Subject to any disclaimer, the term of this patent is extended or adjusted under 35 U.S.C. 154(b) by 562 days.

(21) Appl. No.: 12/422,651

(22) Filed: Apr. 13, 2009

Related U.S. Application Data (60) Provisional application No. 61/044,098, filed on Apr. 11, 2008.

(51) Int. Cl.
*H04L 27/28* (2006.01)

(52) U.S. Cl. .................................. 375/260

(58) Field of Classification Search ............ 375/259, 375/260, 346, 349; 370/203; 455/59
See application file for complete search history.

(56) References Cited

U.S. PATENT DOCUMENTS

| | | | | |
|---|---|---|---|---|
| 7,324,600 | B2* | 1/2008 | Pauli et al. ............ | 375/260 |
| 7,660,229 | B2* | 2/2010 | Papasakellariou et al. ... | 370/203 |
| 2006/0077885 | A1* | 4/2006 | Schnell et al. .......... | 370/203 |
| 2006/0133261 | A1* | 6/2006 | Cosovic et al. .......... | 370/208 |
| 2006/0274817 | A1* | 12/2006 | Lakkis ................ | 375/141 |

OTHER PUBLICATIONS

Mitola, Maguire; Cognitive Radio: Making Software Radios More Personal; IEEE Personal Communications; Aug. 1999; 13-18; IEEE.
Weiss, Jondral; Spectrum Pooling: An Innovative Strategy for the Enhancement of Spectrum Efficiency; IEEE Radio Communications; Mar. 2004; S8-S14; IEEE.
Weiss, Hollenbrand, Krohn, Jondral; Mutual Interference in OFDM-based Spectrum Pooling Systems; Proc. IEEE Veh. Technol. Conf., Oct. 2004; 1873-1877.
Yamaguchi; Active Interference Cancellation Technique for MB-OFDM Cognitive Radio; Proc. IEEE European Microwave Conf.; Oct. 2004; 1105-1108.
Cosovic, Brandes, Schnell; Subcarrier Weighting; a Method for Sidelobe Suppression in OFDM systems; IEEE Communication Letters; Jun. 2006; 444-446; vol. 10, No. 6; IEEE.
Cosovic, Mazzoni; Suppression of Sidelobes in OFDM Systems by Multiple-choice Sequences; European transactions on telecommunications; 2006; 623-630; vol. 17, No. 6.
Cabric, Mishra, Brodersen; Implementation Issues in Spectrum Sensing for Cognitive Radios; Signals, Systems and Computers, 2004; Conference record of the Thirty-eighth Asilomar Conference on; vol. 1; Nov. 2004; 772-776; IEEE.
Gander; Least Squares with a Quadratic Constraint; Numerische Mathematik; vol. 36, No. 3; 291-307, 1981; Springer Verlag.
Mahmoud, Arslan; Sidelobe Suppression in OFDM-Based Spectrum Sharing Systems Using Adaptive Symbol Transition; IEEE Commuications Letters; Feb. 2008; 133-135; IEEE.

* cited by examiner

*Primary Examiner* — Sam K Ahn
(74) *Attorney, Agent, or Firm* — Molly L. Sauter; Smith & Hopen, P.A.

(57) ABSTRACT

In accordance with the present invention, a system and method for orthogonal frequency division multiplexing (OFDM) sidelobe suppression is provided. In a particular embodiment an extension is added to OFDM symbols that is calculated using optimization methods to minimize adjacent channel interference (ACI) while keeping the extension power at an acceptable level. Using this technique, interference to adjacent signals is reduced significantly at the cost of a small decrease in the useful symbol energy. The proposed method can be used by cognitive radio (CR) systems to shape the spectrum of OFDM signals and to minimize interference to licensed users (LU), or to reduce the size of guard bands used in conventional OFDM systems.

16 Claims, 5 Drawing Sheets

ADAPTIVE SYMBOL TRANSITION METHOD FOR OFDM-BASED COGNITIVE RADIO SYSTEMS AND METHOD OF USE

BACKGROUND OF THE INVENTION

Recently, opportunistic usage of licensed frequency bands has been proposed as a solution to spectral crowding problems by using cognitive radio (CR) systems. A cognitive radio system would be able to operate in licensed bands by utilizing vacant parts of these bands. A key point for the success of cognitive radio is the ability to shape its signal spectrum to achieve minimum interference to licensed users.

Orthogonal Frequency Division Multiplexing (OFDM) has been proposed as a candidate signaling technology for cognitive radio applications. By dividing the spectrum into subbands that are modulated with orthogonal subcarriers, OFDM spectrum can be shaped more easily in comparison to other signaling techniques known in the art. However, modulated OFDM subcarriers suffer from high sidelobes, which result in adjacent channel interference (ACI). Thus, disabling a set of OFDM subcarriers to create a spectrum null may not be sufficient to avoid interference to licensed users. On the other hand, using filters to reduce the adjacent channel interference can increase the system complexity and introduce long delays. Using guard bands on both sides of used OFDM spectrum coupled with windowing of the time-domain symbols has been investigated. Other proposed methods include the use of interference cancellation carriers, subcarrier weighting, or multiple-choice sequences. While cancellation carrier techniques can significantly suppress OFDM sidelobes, they result in an increase in the system peak-to-average-power ratio (PAPR), and the performance is sensitive to the cyclic prefix (CR) size. Moreover, due to the higher power used for the cancellation carrier method, using this technique affects the spectral flatness of the transmitted signal and can increase the inter-carrier interference (ICI) in case of a Doppler spread of a frequency offset error at the receiver. On the other hand, subcarrier weighting methods cause an increase in the system bit error rate (BER), and the interference reduction is not as significant as it is with the carrier cancellation method.

In the prior art, windowing of OFDM symbols was investigated as a method to suppress OFDM sidelobes. With this process, the time domain symbols are passed through a filter (usually raised cosine (RC) filters are used), and consecutive symbols are allowed to overlap. The process smoothes the transition between OFDM symbols and thus improves the spectral characteristics of the OFDM signal. To keep the orthogonality between OFDM subcarriers, the symbols are cyclicly extended to cover the overlapping region. The advantage of this approach is its low computational complexity. The disadvantage is the reduced spectral efficiency due to the symbol extension.

Accordingly, what is needed in the art is an improved system and method to suppress OFDM sidelobes and shape the signal spectrum for use in cognitive radio applications.

SUMMARY OF INVENTION

The present invention provides a system and method which employs adaptive symbol transition (AST) to suppress OFDM sidelobes and shape the signal spectrum. In the present invention, the OFDM symbols are extended in time to reduce the effect of symbol transition. However, instead of using a predefined filter shape, as is known in the prior art, the transition signal is optimized adaptively based on transmitted data and detected licensed user bands to reduce the interference to licensed users.

In accordance with the present invention, a method for sidelobe suppression in an orthogonal frequency division multiplexing (OFDM) based cognitive system is provided comprising the steps of: scanning an operation band of the cognitive system to detect at least one current licensed user operating in the operation band, each of the detected current licensed users having a corresponding center frequency and a corresponding bandwidth; disabling a plurality of subcarriers associated with each of the current licensed users, the subcarriers disabled based upon the corresponding center frequency and corresponding bandwidth of each of the current licensed users; creating an index of the disabled subcarriers, the index comprising the center frequency and bandwidth for the current licensed users; receiving a current time domain OFDM symbol to be transmitted over a set of active subcarriers in the operation band, the current OFDM symbol comprising modulated data; receiving a next time domain OFDM symbol to be transmitted over the set of active subcarriers in the operation band, the next time domain OFDM symbol comprising modulated data; calculating an OFDM symbol extension to be added to the received current OFDM symbol, the OFDM symbol extension calculated based upon the set of active subcarriers, the index of the disabled subcarriers, the modulated data of the current OFDM symbol, the modulated data of the next OFDM symbol and a desired symbol extension length; and extending the current OFDM symbol using the calculated OFDM symbol extension to suppress the sidelobes of the OFDM symbols and reduce interference to the licensed users.

A cyclic prefix may be added to the OFDM symbols prior to calculating the symbol extension.

The present invention provides a system for sidelobe suppression in a cognitive transmitter employing orthogonal frequency division multiplexing (OFDM), the system comprises: a cognitive engine for scanning an operation band of the cognitive transmitter to detect at least one current licensed user operating in the operation band, each of the detected current licensed users having a corresponding center frequency and a corresponding bandwidth and to disable a plurality of subcarriers associated with each of the current licensed users, the subcarriers disabled based upon the corresponding frequency and corresponding bandwidth of each of the current licensed users, and an adaptive symbol transition unit coupled to the cognitive engine, the adaptive symbol transition unit for creating an index of the disabled subcarriers, the index comprising the center frequency and bandwidth for the current licensed users; receiving a current time domain OFDM symbol to be transmitted over a set of active subcarriers in the operation band, the current OFDM symbol comprising modulated data; receiving a next time domain OFDM symbol to be transmitted over a set of active subcarriers in the operation band, the next OFDM symbol comprising modulated data; calculating an OFDM symbol extension to be added to the received current OFDM symbol, the OFDM symbol extension calculated based upon the set of active subcarriers, the index of the disabled subcarriers, the modulated data of the current OFDM symbol, the modulated data of the next OFDM symbol and a desired symbol extension length; and extending the current OFDM symbol using the calculated OFDM symbol extension to suppress the sidelobes of the OFDM symbols and reduce interference to the licensed users.

The system may be a cognitive radio system or a broadband wireless system.

The present invention introduces a further reduction of interference with less power consumption and more robustness to different system and channel parameters.

The present invention introduces a new method for OFDM signals sidelobe suppression. The proposed method can reduce the interference caused by OFDM systems to adjacent users operating in the same channel Using the invention presented here results in the increase of spectral efficiency of the system and thus increasing the data rates.

The present invention can reduce interference caused by OFDM systems (e.g. WiFi and WiMAX systems) to users operating in adjacent bands. By minimizing interference, users can send at higher powers and thus achieve higher data rates.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

A cognitive radio system employing OFDM as the signaling technique is provided in accordance with the present invention. The cognitive radio is assumed to be aware of the surrounding environment and the radio channel characteristics. After scanning the channel, the cognitive radio should be able to identify licensed users operating within the same band. The goal of cognitive radio is to exploit available spectrum opportunities and achieve the highest possible spectral efficiency while keeping the interference to the licensed users at a minimum.

Figure 1:
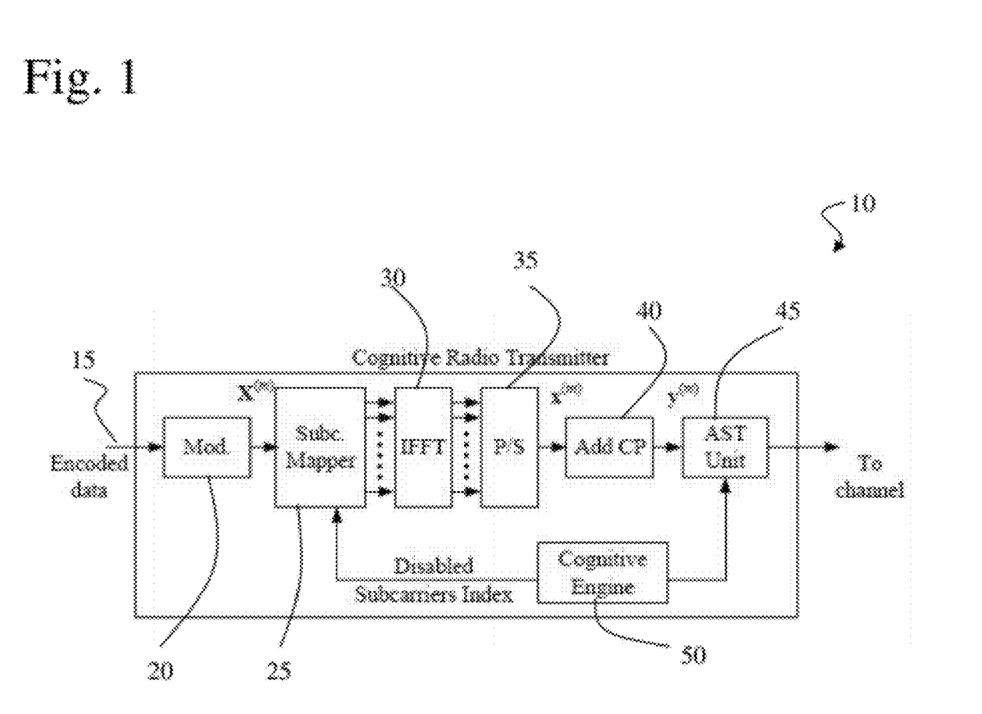
FIG. 1 is a diagrammatic view of a system model in accordance with the present invention.

The system is accordance with the present invention is illustrated with reference to FIG. 1. In the cognitive radio transmitter 10 of the present invention, the encoded data 15 to be transmitted is fed to a modulator 20 to be modulated and subsequently fed to an N-point inverse fast Fourier transform (IFFT) unit 30. In this case, $F_{N_1,N_2} = \{F_{n_1,n_2}\}$ is defined as the $N_1$-point Fourier transform matrix of a vector of length $N_2$, where $$F_{n_1,n_2} = \exp\left(\frac{-j2\pi n_1 n_2}{N_1}\right). \quad (1)$$

The time domain signal at the output of the IFFT 30 is $$x^{(m)} = \frac{1}{N} F_{N,N}^* X^{(m)}, \quad (2)$$

where (m) is the symbol index, N is the IFFT size, $(.)^*$ is the complex conjugate operator, $$\frac{1}{N} F^*$$

is the inverse Fourier transform matrix, and $X^{(m)} = [X_1^{(m)}, X_2^{(m)}, \ldots, X_N^{(m)}]^T$ is the modulated data vector. The signal is then extended with a cyclic prefix 40 consisting of G samples and the extended symbols $y^{(m)}$ are fed to an adaptive signal transition block 45. Meanwhile, the cognitive engine 50 passes required information regarding licensed users operating in the same band to both the subcarrier mapper 25 and the adaptive signal transition block 45. This information is used to disable subcarriers operating in the licensed user's bands to suppress the interference to the licensed users caused by OFDM sidelobes.

The adaptive symbol transition technique in accordance with the present invention suppresses OFDM sidelobes by extending OFDM symbols and thus using the extensions to smooth the transition between consecutive symbols. However, instead of using a predefined window shape (e.g., raised cosine filter) to determine the value of the symbol extension, the present invention proposes an adaptive method that calculates the value of the symbol extension based on licensed user's center frequency and bandwidth.

Figure 2:
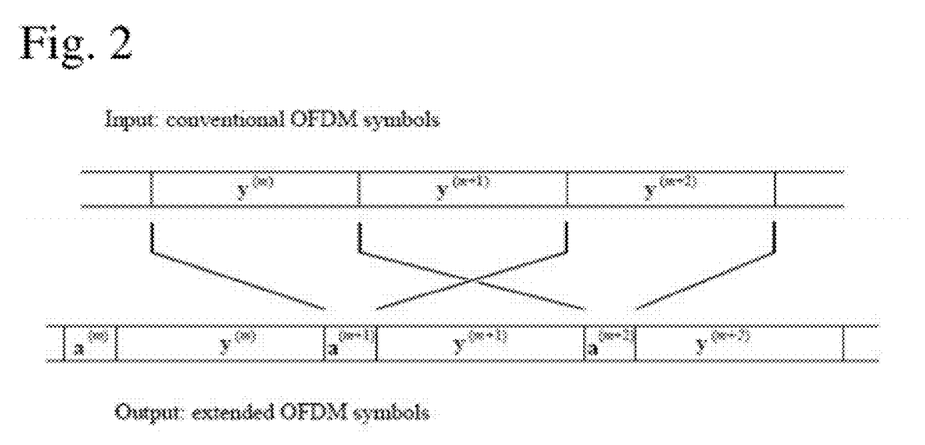
FIG. 2 is a diagrammatic view of the output of the adaptive symbol transition (AST) block in accordance with an embodiment of the present invention.

Assume the cognitive system detects a licensed user signal spanning over K subcarriers $(X_{i+1}, X_{i+2}, \ldots X_{i+K})$, where $i\Delta f$ is the licensed signal offset with respect to the OFDM signal, $K\Delta f$ is the licensed signal bandwidth, and $\Delta f$ is the frequency subcarrier spacing. In the present invention, the above subcarrier set is disabled to avoid interfering with the licensed user. In addition, to further suppress the interference, the adaptive symbol transition block adds an extension $a^{(m)} = [a_1^{(m)}, a_2^{(m)}, \ldots a_C^{(m)}]^T$ to every OFDM symbol $y^{(m)}$ as shown in FIG. 2, where C is the number of samples in $a^{(m)}$, and $y^{(m)}$ and $y^{(m-1)}$ are used to calculate $a^{(m)}$ in the following manner.

First, the interference to the licensed user is examined. The signal is upsampled by a factor of ξ or in other words, ξ points per subcarrier are considered. The signal spectrum of two consecutive symbols can be obtained as, $$S^{(m)} = F_{\zeta,N,\beta} \underbrace{\begin{bmatrix} y^{(m-1)} \\ a^{(m)} \\ y^{(m)} \end{bmatrix}}_{z^{(m)}}, \quad (3)$$

where β=2N+2G+C. The interference to the licensed user is then, $$I_L = F_K z_K^{(m)}, \quad (4)$$

where $F_K$ is a subset of $F_{\xi, N, \beta}$ containing only the rows that correspond to the licensed user band (rows ξ(i+1) to ξ(i+K)) and $z_K^{(m)}$ is the same as $z^{(m)}$ but with $a^{(m)} = [0]_{c \times 1}$. To minimize interference power, the adaptive symbol transition block chooses $a^{(m)}$ such that, $$a^{(m)} = \underset{a^{(m)}}{\operatorname{argmin}} \|F_I a^{(m)} + I_L\|^2, \quad (5)$$

where $F_I$ is a subset of $F_K$ containing only the columns that correspond to $a^{(m)}$; columns N+G to N+G+C−1.

The mean-squared-error (MSE) solution to (5) can result in very high values for $a^{(m)}$. This leads to an increase in the extension power. As a result, the useful symbol energy is reduced compared to the total symbol energy, resulting in an increase in the system BER (bit error ratio). The mitigate this effect, the present invention adds a constraint on the minimization in (5) such that the symbol extension power is below a given level $\alpha^2$, $$\|a^{(m)}\|^2 \leq \alpha^2 \quad (6)$$

The optimization in (5) and (6) is known as linear least squares problem with a quadratic inequality constraint. Using singular value decomposition (SVD), we get, $$U^H F_I V = \begin{bmatrix} D_{F_I} \\ 0 \end{bmatrix} \quad (7)$$

and, $$D_{F_I} = \operatorname{diag}(v_1, \ldots v_C), v_i \geq 0, \quad (8)$$

where $(.)^H$ is the Hermitian transpose, $[U]_{\Psi \times \Psi}$ and $[V]_{C \times C}$ are unitary, and $\Psi = \xi(K-1)+1$. Using the method of Lagrange multipliers, we get the following equation, $$f(\lambda) = \sum_{i=1}^{C} \frac{v_i^2 \tilde{I}_{L,i}^2}{(v_i^2 + \lambda)^2} = \alpha^2, \quad (9)$$

where $\tilde{I}_L = U^H I_L = [\tilde{I}_{L,1}, \ldots \tilde{I}_{L,\Psi}]^T$. If a solution exists to the optimization problem, the function $f(\lambda)$ will have a unique positive root and it has been shown that this is the desired root. The solution can be obtained as, $$a^{(m)} = V[-v_1 \tilde{I}_{L,1}/(v_1^2+\tilde{\lambda}), \ldots, -v_C \tilde{I}_{L,C}/(v_c^2+\tilde{\lambda})]^T, \quad (10)$$

where $\tilde{\lambda}$ is the unique positive root of (9). Fortunately, for a given spectrum shape $F_I$ is fixed and thus, only $I_L$ needs to be updated for every OFDM symbol. The computational complexity of the optimization problem is reduced significantly due to this fact.

An important parameter of OFDM systems is the peak-to-average power ratio (PAPR) which affects the dynamic range over which the system should be linear. By choosing $\alpha^2$ such that, $$\alpha^2 = C/(N+G)E_S, \quad (11)$$

the signal average power is kept at the same level, where $E_S$ is the symbol energy prior to the adaptive symbol transition block. Since the adaptive symbol transition signal is optimized to smooth the symbol transition, it does not introduce any peaks to the signal (confirmed by simulations results) and, thus, the PAPR of the system does not increase. Nevertheless, the adaptive symbol transition of the present invention reduces the useful symbol energy. Using (11) the maximum signal-to-noise ratio (SNR) loss $\gamma$ is, $$\gamma = 10 \log_{10}\left(\frac{E_S + \alpha^2}{E_S}\right) \text{dB}. \quad (12)$$

By controlling the number of samples, C, and for a fixed PAPR, the system of the present invention provides a tradeoff between reducing $\gamma$ (by reducing C), or improving the interference suppressing (by increasing C).

It is noteworthy that since the adaptive symbol transition technique in accordance with the present invention is performed on time-domain symbols, the performance is not sensitive to the cyclic prefix size. In addition, the adaptive symbol transition does not introduce any inter-symbol interference (ISI) to the system as the leakage from the symbol extension is contained in the cyclic prefix. The intended receiver can remove the adaptive symbol transition extension along with the cyclic prefix to maintain an ISI-free signal.

Figure 3:
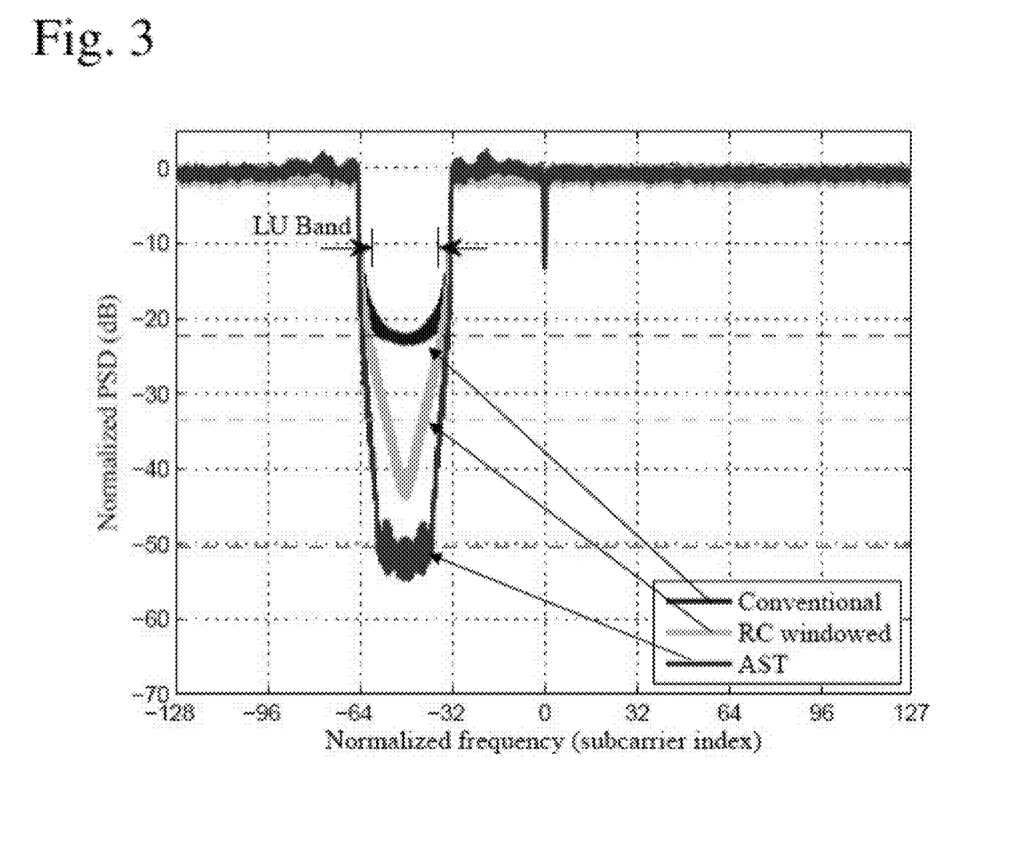
FIG. 3 is a diagrammatic view of a spectrum of an OFDM signal with 32 subcarriers gap in accordance with an embodiment of the present invention.

The performance of the method in accordance with the present invention is investigated using computer simulations. In a particular embodiment of the present invention is provided an OFDM-based cognitive radio system with N=256 and G=16. The AST method is in accordance with the present invention is used with C=16, $\xi$=16, and, based on (11), $\alpha^2$=0.06$E_S$. The DC subcarrier is disabled. Data subcarriers are modulated with a QPSK signal. All results shown are averaged over 10,000 OFDM symbols. Two cases were considered for performance evaluation. In the first case, a licensed user is detected spanning 24 OFDM subcarriers. The system disables 32 subcarriers leaving a guard band of 4 subcarriers on each side of the licensed user band. The guard bands are to allow the signal power to decay while the adaptive symbol transition block performs the optimization over the 24-subcarrier band. The normalized power spectral density (PSD) of the signal at the output of the adaptive symbol transition block is measured and the results are shown in FIG. 3. The system performance is compared with a conventional OFDM system without any symbol extension and with an OFDM system using RC windowing and a symbol duration equal to the adaptive symbol transition system of the present invention. The conventional OFDM system suffers an interference level of −22 dB. The RC-windowed system suppressed the interference to −33 dB, while the adaptive symbol transition system in accordance with the present invention, reduces the interference further to less than −50 dB. Accordingly, the adaptive symbol transition method achieves a 28 dB gain over conventional systems while keeping the SNR loss less than 0.25 dB.

In an additional embodiment the adaptive symbol transition method in accordance with the present invention is used to reduce the number of disabled subcarriers used as guard bands in current OFDM systems. For example, a WiMAX system employing a 256 subcarriers OFDM system disables 55 subcarriers (28 and 27 on the left and right sides, respectively) to limit out-of-band radiations.

Figure 4:
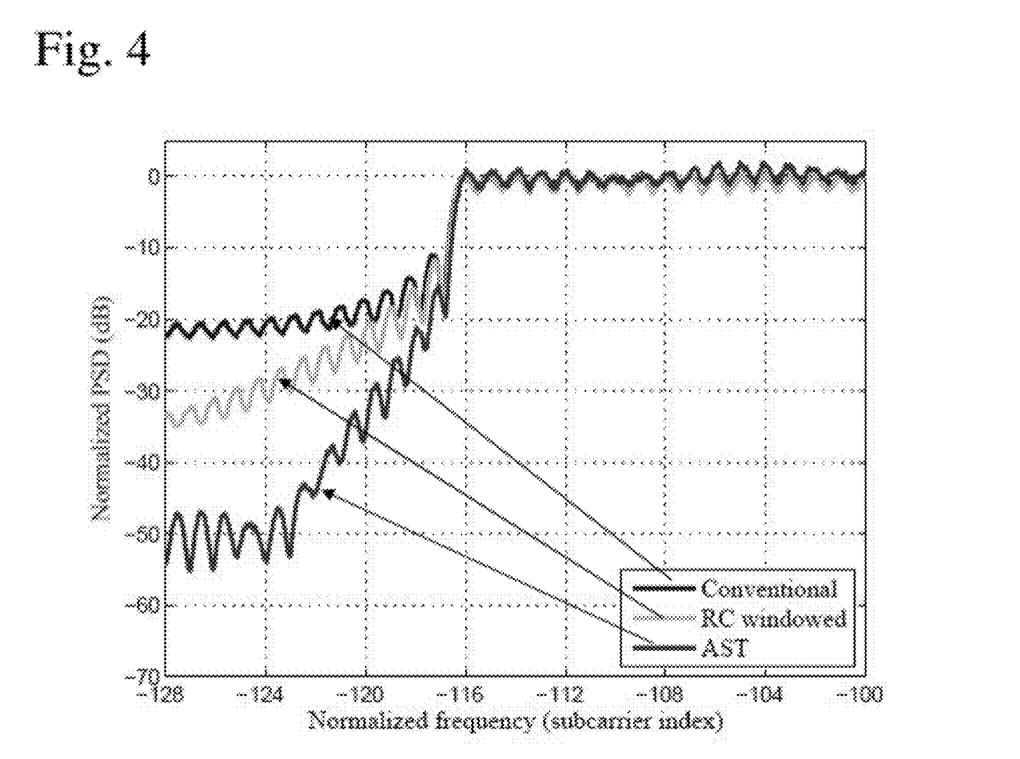
FIG. 4 is a diagrammatic view of a spectrum of an OFDM signal with 12 subcarriers guard band in accordance with an embodiment of the present invention.

Using sidelobe suppression techniques, the required guard band can be reduced for an increase in system complexity. In an embodiment using 24 subcarriers (12 on each side) as guard bands, N, G, C, $\xi$ and $\alpha^2$ are the same as in the previous embodiment. The normalized PSD of the left side of the signal is shown in FIG. 4. The adaptive symbol transition method of the present invention suppresses the signal power to −50 dB by the end of the in-band signal compared to −32 dB for RC-window method and −20 dB for conventional systems.

Figure 5:
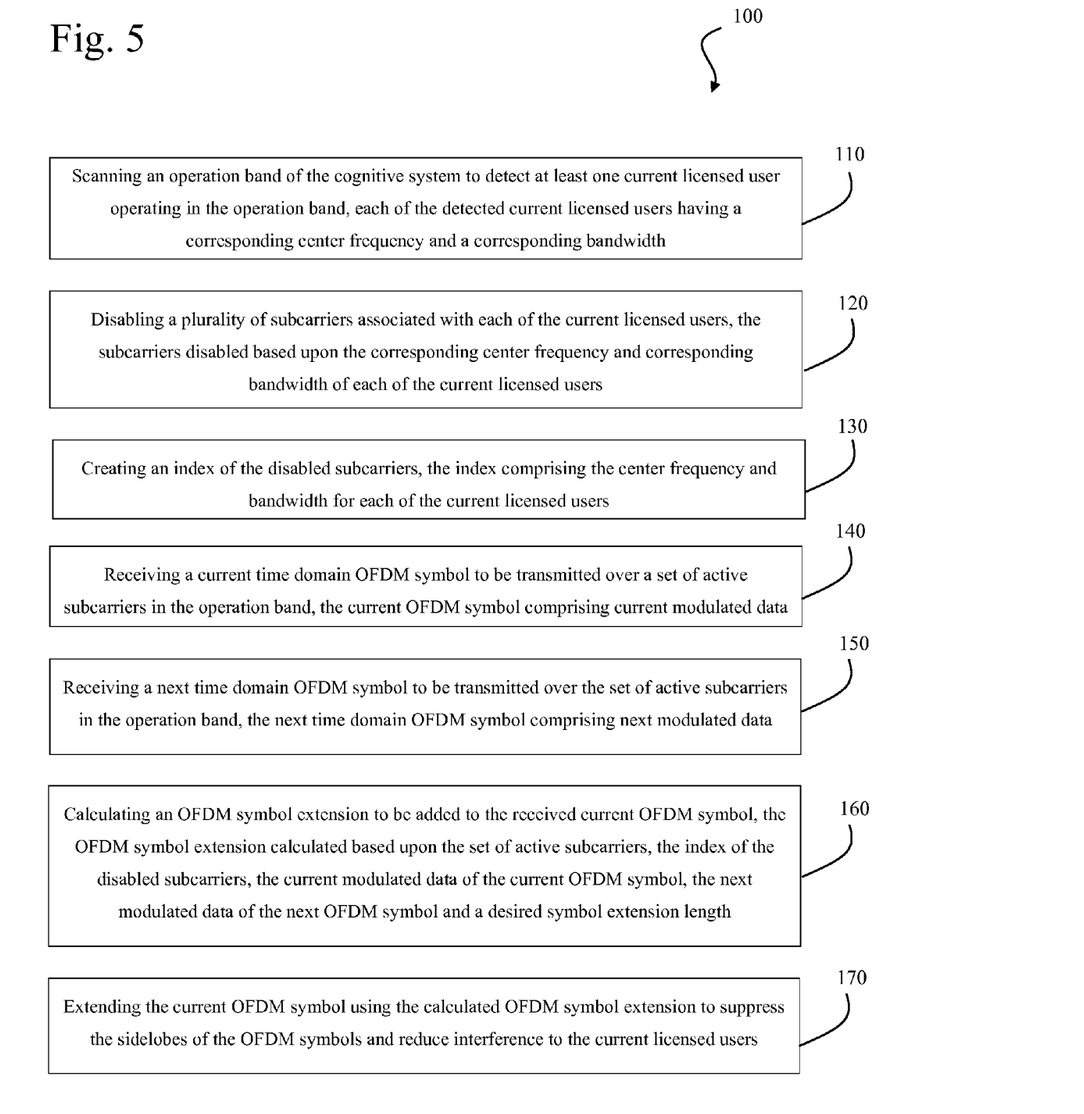
FIG. 5 is a flow diagram illustrating a method for sidelobe suppression in an orthogonal frequency division multiplexing (OFDM) based cognitive system in accordance with an embodiment of the present invention.

With reference to FIG. 5, a method for sidelobe suppression in an orthogonal frequency division multiplexing (OFDM) based cognitive system in accordance with an embodiment of the present invention 100 includes, scanning an operation band of the cognitive system to detect at least one current licensed user operating in the operation band, each of the detected current licensed users having a corresponding center frequency and a corresponding bandwidth 110, disabling a plurality of subcarriers associated with each of the current licensed users, the subcarriers disabled based upon the corresponding center frequency and corresponding bandwidth of each of the current licensed users 120, creating an index of the disabled subcarriers, the index comprising the center frequency and bandwidth for each of the current licensed users 130, receiving a current time domain OFDM symbol to be transmitted over a set of active subcarriers in the operation band, the current OFDM symbol comprising current modulated data 140, receiving a next time domain OFDM symbol to be transmitted over the set of active subcarriers in the operation band, the next time domain OFDM symbol comprising next modulated data 150, calculating an OFDM symbol extension to be added to the received current OFDM symbol, the OFDM symbol extension calculated based upon the set of active subcarriers, the index of the disabled subcarriers, the current modulated data of the current OFDM symbol, the next modulated data of the next OFDM symbol and a desired symbol extension length 160 and extending the current OFDM symbol using the calculated OFDM symbol extension to suppress the sidelobes of the OFDM symbols and reduce interference to the current licensed users 170.

In accordance with the present invention, a new system and method are provided to suppress OFDM sidelobes and shape the spectrum of OFDM signals. The proposed adaptive symbol transition method of the present invention extends OFDM symbols and uses the extension to reduce adjacent channel interference (ACI) to other users operating in the same band. Simulation results shown that the adaptive symbol transition method in accordance with the present invention can achieve a significant gain over conventional sidelobe suppression techniques. Moreover, the adaptive symbol transition method in accordance with the present invention does not increase the signal peak-to-average power ratio (PAPR) and keeps a low signal-to-noise ratio (SNR) loss.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for sidelobe suppression in an orthogonal frequency division multiplexing (OFDM) based cognitive system, the method comprising:
    scanning an operation band of the cognitive system to detect at least one current licensed user operating in the operation band, each of the detected current licensed users having a corresponding center frequency and a corresponding bandwidth;
    disabling a plurality of subcarriers associated with each of the current licensed users, the subcarriers disabled based upon the corresponding center frequency and corresponding bandwidth of each of the current licensed users;
    creating an index of the disabled subcarriers, the index comprising the center frequency and bandwidth for each of the current licensed users;
    receiving a current time domain OFDM symbol to be transmitted over a set of active subcarriers in the operation band, the current OFDM symbol comprising current modulated data;
    receiving a next time domain OFDM symbol to be transmitted over the set of active subcarriers in the operation band, the next time domain OFDM symbol comprising next modulated data;
    calculating an OFDM symbol extension to be added to the received current OFDM symbol, the OFDM symbol extension calculated based upon the set of active subcarriers, the index of the disabled subcarriers, the current modulated data of the current OFDM symbol, the next modulated data of the next OFDM symbol and a desired symbol extension length; and
    extending the current OFDM symbol using the calculated OFDM symbol extension to suppress the sidelobes of the OFDM symbols and reduce interference to the current licensed users.

2. The method of claim 1, wherein the cognitive system is a cognitive radio system.

3. The method of claim 1, further comprising adding a cyclic prefix to the current OFDM symbol prior to calculating the OFDM symbol extension.

4. The method of claim 1, further comprising adding a cyclic prefix to the next OFDM symbol prior to calculating the OFDM symbol extension.

5. The method of claim 1, wherein disabling a plurality of subcarriers associated with each of the current licensed users comprises disabling a plurality of guard band subcarriers associated with each of the current licensed users.

6. The method of claim 5, further comprising, reducing the number of disabled guard band subcarriers after the current OFDM symbol has been extended.

7. The method of claim 1, prior to receiving the current OFDM symbol, further comprising:
    receiving an encoded serial data stream;
    modulating the encoded serial data stream;
    converting the encoded serial data stream to a plurality of parallel data streams;
    processing the plurality of parallel data streams through an N-point Inverse Fast Fourier Transform (IFFT) unit to produce a plurality of parallel time domain OFDM symbol streams;
    converting the plurality of parallel time domain OFDM symbol streams to a serial time domain OFDM symbol stream comprising a plurality of OFDM symbols; and
    adding a cyclic prefix to the OFDM symbols in the serial OFDM symbol stream.

8. The method of claim 1, further comprising:
    determining if the licensed users in the operation band have changed, and if the licensed users have changed;
    re-scanning the operation band of the cognitive system to detect at least one current licensed user operating in the operation band;
    disabling a plurality of subcarriers associated with each of the current licensed users, the subcarriers disabled based upon the corresponding center frequency and corresponding bandwidth of each of the current licensed users; and creating an index of the disabled subcarriers, the index comprising the center frequency and bandwidth for the current licensed users.

9. A system for sidelobe suppression in a cognitive transmitter employing orthogonal frequency division multiplexing (OFDM), the system comprising:
- a cognitive engine for scanning an operation band of the cognitive transmitter to detect at least one current licensed user operating in the operation band, each of the detected current licensed users having a corresponding center frequency and a corresponding bandwidth and to disable a plurality of subcarriers associated with each of the current licensed users, the subcarriers disabled based upon the corresponding frequency and corresponding bandwidth of each of the current licensed users;
- an adaptive symbol transition unit coupled to the cognitive engine, the adaptive symbol transition unit configured to:
  - create an index of the disabled subcarriers, the index comprising the center frequency and bandwidth for the current licensed users;
  - receive a current time domain OFDM symbol to be transmitted over a set of active subcarriers in the operation band, the current OFDM symbol comprising current modulated data;
  - receive a next time domain OFDM symbol to be transmitted over a set of active subcarriers in the operation band, the next OFDM symbol comprising next modulated data;
  - calculate an OFDM symbol extension to be added to the received current OFDM symbol, the OFDM symbol extension calculated based upon the set of active subcarriers, the index of the disabled subcarriers, the current modulated data of the current OFDM symbol, the next modulated data of the next OFDM symbol and a desired symbol extension length; and
  - extend the current OFDM symbol using the calculated OFDM symbol extension to suppress the sidelobes of the OFDM symbols and reduce interference to the current licensed users.

10. The system of claim 9 wherein the cognitive system is a cognitive radio system.

11. The system of claim 9 wherein the cognitive system is a broadband wireless system.

12. The system of claim 9, further comprising a modulator to receive an encoded serial data stream.

13. The system of claim 12, further comprising a serial to parallel converter coupled to the modulator, the serial to parallel converter to convert the encoded serial data stream to a plurality of parallel data streams.

14. The system of claim 13, further comprising an N-point Inverse Fast Fourier Transform (IFFT) unit coupled to the serial to parallel converter, the IFFT unit to output a plurality of parallel time domain OFDM symbol streams.

15. The system of claim 14, further comprising a parallel to serial converter coupled to the output of the IFFT, the parallel to serial converter to receive the plurality of parallel time domain OFDM symbol stream and to output a serial time domain OFDM symbol stream.

16. The system of claim 15, further comprising a cyclic prefix unit coupled to the output of the parallel to serial converter, the cyclic prefix unit to receive the serial time domain OFDM symbol stream, to add a cyclic prefix to the OFDM symbols of the serial time domain OFDM symbol stream and to output the current time domain OFDM symbol and the next time domain OFDM symbol to the adaptive symbol transition unit.

* * * * *